May 12, 1953

C. A. KEMPF ET AL 2,638,418

MILK PRODUCT CONTAINING MILK FAT, AND
PROCESS OF PRODUCING SAME

Filed July 3, 1952

INVENTORS.
Clayton A. Kempf,
Joy Sutherland Neidlinger,
Aubrey P. Stewart, Jr.,
Paul F. Sharp May 12, 1953   C. A. KEMPF ET AL   2,638,418
MILK PRODUCT CONTAINING MILK FAT, AND
PROCESS OF PRODUCING SAME
Filed July 3, 1952   2 Sheets-Sheet 2

INVENTORS.
Clayton A. Kempf,
Joy Sutherland Neidlinger,
Aubrey P. Stewart, Jr.,
Paul F. Sharp,
By Wilkinson, Huxley, Byron & Hume
ATTYS Patented May 12, 1953

2,638,418

UNITED STATES PATENT OFFICE 2,638,418

MILK PRODUCT CONTAINING MILK FAT, AND PROCESS OF PRODUCING SAME

Clayton A. Kempf, Berkeley, Joy Sutherland Neidlinger, San Francisco, Aubrey P. Stewart, Jr., Berkeley, and Paul F. Sharp, Oakland, Calif., assignors to Golden State Company, Ltd., San Francisco, Calif., a corporation of Delaware Application July 3, 1952, Serial No. 297,201

26 Claims. (Cl. 99—56)

This invention relates to a new and improved milk product containing milk fat which is particularly adapted for use in the manufacture of various food products and is capable of imparting a desired flavor to such products.

The product of this invention, when used in the production of milk chocolate, imparts to the chocolate a very distinctive and pleasing flavor and taste.

This invention also relates to a new and improved process, according to which the novel product herein referred to, may be produced.

This application is a continuation-in-part of applicants' copending application Serial No. 169,686, filed January 22, 1950, for Improvements in Milk Product Containing Milk Fat, and Process of Producing Same, now abandoned.

Whereas it has been known for some years that the flavor of certain food products can be improved by utilizing therein milk solids including partially hydrolyzed milk fat, as far as these applicants know, no one prior to the present invention has succeeded in producing, on a commercial basis, a milk product having free fatty acids therein produced by a controlled hydrolysis which is so carried out that it gives to the product taste-imparting characteristics equal to or even approaching those possessed by the product of the present invention. The applicants have discovered that whereas the presence of free fatty acids in milk gives a characteristics flavor to the milk which in turn imparts a desirable flavor to certain products, such as milk chocolate, the preferred flavor requires controlled hydrolysis of the fats for the production of a particular combination of fatty acids in which the various fatty acids exist in particular proportions, and that it is necessary to avoid in the final product the presence of certain unwanted fatty acids which, when included, either give to the product an undesirable flavor or exert a depressing effect upon the desired flavor.

Accordingly, it is an object of this invention to provide a product of the above-described type which contains free fatty acids in combination and proportion such as will impart to products, especially milk chocolate, a superior and desirable flavor. It is also an object hereof to provide a process according to which milk products of the type referred to may be satisfactorily produced on a commercial basis.

The fact that fats which have undergone some hydrolysis are capable of affecting to a noticeable degree the flavor of chocolate, has been known for a period of at least twenty years. Stimulated by this knowledge, chocolate and dairy companies have spent large sums of money in an effort to develop a satisfactory method of producing a milk fat product to be used in chocolate to give to the chocolate a desirable flavor, or, in other words, that flavor referred to in the art as "a high milk" flavor. As far as these applicants know, no successful commercial process has yet been devised which involves a controlled hydrolysis of the type characteristic of this invention. Much of the work that has been conducted has been carried out in secret, and as a result there is very little to be found in the literature on this subject. Apparently not much is known at the present time in regard to the factors which enter into and control the solution of this problem.

Among the earliest work on this subject was that carried out by Herbert O. Otting, the results of which are disclosed in his two United States Letters Patent No. 1,966,460 and No. 2,169,278.

Another worker in this field was Herbert A. Hollender, whose experiments have been published in the Confectioner's Journal, issue of November 1949, pages 44–47.

After extensive experimentation, the applicants have made certain observations and discoveries relating to the production of a product of the type here referred to. First, it has been found that, in order to obtain the desired flavor characteristics, the natural lipase contained in the milk to be processed must be employed as the principal enzyme utilized for the hydrolysis activity, and that introduction of enzymes from other sources is to be avoided, except for possibly accomplishing a minor amount of the total hydrolysis. It is further found, however, that this fact presents a difficult problem because as heretofore known the natural lipase in milk, without special handling or assistance, will not produce free fatty acids in the quantities required within a time period sufficiently short to avoid bacteriological spoilage, nor for that matter within a time period permitting production practices accommodating the demands of a daily milk supply. In order to overcome this difficulty, these applicants have discovered that certain controls can be exercised which will accelerate the hydrolysis activity produced by the natural lipase of the milk to such an extent that spoilage is avoided and, in addition, the demands of a daily milk supply can be met on a satisfactory commercial basis.

It has been found, for instance, that the hydrolysis treatment should be conducted at a relatively low temperature, that is to say, in the neighborhood of between 30° F. and 50° F. Due to the fact that the natural lipase activity in milk is apparently inhibited by the development of lactic acid by bacterial growth, the hydrolysis generally proceeds at this relatively low temperature at a greater rate than would occur at more elevated temperatures where bacterial growth is more rapid. This is especially true when the raw milk employed has a relatively large amount of lactic acid producing bacterial present, as is the case of most manufacturing grade milk used in the production of milk powder. The utilization of this relatively low temperature for the hydrolysis treatment, therefore, constitutes one of the control factors which enables the hydrolysis to be completed within the time limit dictated by the above-mentioned factors.

In addition, it has been discovered that hydrolysis conducted at this relatively low temperature is productive of a free fatty acid mixture or combination which differs materially from the combination of free fatty acids produced at more elevated temperatures. For instance, at the relatively low temperature referred to, the hydrolysis is productive of an increased amount of steam-volatile acids of both the water-soluble and water-insoluble types, in relation to the amount of non-volative acids produced at such temperature.

The applicants have further discovered that an hydrolysis of substantially 5% of fat to free fatty acids is approximately correct for a product possessing the highest flavor characteristics. In addition, the fatty acids so produced should consist of a mixture made up of volatile water-soluble free fatty acids, volatile water-insoluble free fatty acids, and non-volatile water-insoluble free fatty acids, all of which are present in predetermined relative proportions as hereinafter set forth.

It has also been discovered that by conducting the hydrolysis treatment at relatively low temperatures as hereinabove set forth, and by exercising certain additional controls which are hereinafter described in detail, the hydrolysis is carried out within a satisfactory period and, in addition, is productive of a mixture or combination of free fatty acids present in relative quantities aproximating the desired quantities for each of the three categories, respectively, with the exception, however, that the volatile water-soluble acids and the volatile water-insoluble acids are produced somewhat in excess of the amount productive of the best flavor characteristics.

As a further step, however, the applicants have also discovered that such excessive production of the volatile water-soluble acids and volatile water-insoluble acids is not objectionable provided that such portions thereof are subsequently eliminated from the fatty acid mixture. Consequently, and as a further step, this invention contemplates the removal of a limited quantity of the volatile water-soluble acids and volatile water-insoluble acids preferably by steam distillation, and the production of a combination or mixture of the remaining acids possessing the property of imparting the high milk flavor characteristics desired.

If efforts are made to curtail the production of the volatile water-soluble acids and the volatile water-insoluble acids in proportion to the non-volatile water-insoluble acids by using a somewhat higher hydrolyzing temperature, the hydrolyzing period would be prohibitively extended under conditions more favorable to bacterial growth and without any assurance of realizing the desired result. The use of a higher temperature during the incubation period not only slows down hydrolysis activity by establishing a temperature condition which is more favorable to lactic acid production by bacteria but also establishes a temperature condition where actual bacterial spoilage may result before hydrolysis is sufficiently complete.

As additional controls to be exerted during the preparation of the milk for incubation and during the incubation period, the following practices should be carried out:

*Clarification*

Prior to the incubation of the milk, it is preferable to subject the milk to a thorough clarification treatment, particularly in those cases where the milk contains significant quantities of leucocytes. The purpose of the clarification is to remove from the milk certain inhibitory substances which are believed to be associated with leucocytes in the milk and which depress or inhibit the activity of the natural lipase of the milk. The need for such clarification will vary with different milks, but it is important in all cases to remove such inhibitory substances whenever they are present, as otherwise such substances act to seriously prolong the incubation period.

The removal of such inhibitory substances is preferably carried out in a centrifugal type of clarifier, as a thorough removal of such inhibitory substances is necessary for best results.

Furthermore, the clarification action should preferably be conducted at a temperature of approximately 65° F. Higher temperatures impair the efficiency of the removal operation, and tests indicate that temperatures in excess of approximately 90° F. should not be employed.

By actual test, clarification of a milk with an initially low leucocyte content caused an increase in the development of free fatty acids of only approximately 5% in a given period of time, whereas clarification of a milk with a relatively high initial leucocyte content caused as much as 50% increase in the development of free fatty acids in a given period of time.

Experiments also show that good results are obtained when clarification is carried out at a temperature of approximately 65° F., but that some benefits are realized at temperatures as high as 90° F.

*Control of concentration of fat in milk being treated*

It is found that the concentration of fat in the milk being treated has a substantial effect upon the rate of hydrolysis produced by the natural lipase present in the milk. The effect, however, is not so great in the early stages of the hydrolysis activity but is very marked in the latter stages thereof.

In order to conduct the necessary hydrolysis within the permissible time period, it is necessary to utilize fat concentrations of approximately 12% or less. Actually, it is found to be preferable to use concentrations in the neighborhood of approximately 3% to 4%. For instance, a fat content of 3.7% is found to give excellent results and, in addition, to give approximately 28.5% of fat in dried milk powder which is the amount required by the chocolate industry for whole milk powder used in the production of milk chocolate. In view of the fact that the higher fat concentrations can be used in the early stages, it is possible to initiate the hydrolysis activity at concentrations somewhat higher such as, for instance, concentrations in the neighborhood of approximately 20%. Such high concentrations, however, should not be used for more than approximately five to eight hours, and thereafter it is necessary to substantially reduce the concentration to levels below approximately 12%, as otherwise the hydrolysis will not go forward to completion within the permissible time period.

Homogenization

It is highly important in carrying out this invention to homogenize the milk undergoing treatment after it has been clarified as above pointed out and before it is submitted to hydrolysis by the natural lipase of the milk. It is known that hydrolysis as effected by the natural lipase of the milk progresses at a rather slow rate in unhomogenized milk, and that the rate thereof is materially increased by homogenization. Accordingly, this process contemplates an efficient homogenization treatment according to which the particle size of the fat globules is reduced to a size of approximately three microns or less in diameter. The smaller the particle size the better, wherefore the preferred practice is to reduce the fat globules to sizes less than approximately two microns in diameter.

For the best results, the homogenization should be conducted at the highest possible temperature compatible with the objectives of the process. It happens, however, that at temperatures around 120° F. some destruction of the natural lipase of the milk sets in, wherefore it is preferable to introduce the milk into the homogenizer at temperatures which will cause it to emerge at a temperature of not substantially greater than 115° F. Accordingly, the milk can be introduced into the homogenizer at temperatures ranging from approximately 103° F. to 106° F., with the result that good homogenizing temperatures are reached without materially affecting the lipase activities.

Agitation

It is known that the rate of hydrolysis that occurs in milk by the action of the natural lipase contained therein is retarded as the concentration of free fatty acids, resulting from such hydrolysis, increases. This fact and the further fact that it is necessary to the success of the present process to accelerate to the maximum extent the rate of hydrolysis, make it important to avoid the creation of high fatty acid concentrations within the localities of the water-fat interfaces where hydrolysis activity is occurring. This is best accomplished by subjecting the milk, during the hydrolysis treatment, to agitation, particularly during the later stages of the hydrolysis treatment, when relatively large quantities of free fatty acids are present. Such agitation serves to distribute throughout the mass of milk the free fatty acids formed during the hydrolysis and to thus remove such acids from the water-fat interface where their presence would retard the hydrolysis in the manner described.

Good agitation for this purpose is effected by any suitable means which will vigorously carry out this objective. By way of illustration, one method of accomplishing the desired agitation is to recirculate the milk during hydrolysis by means of a centrifugal pump working near the limit of its maximum head pressure.

Incubation temperatures

As stated above, this process involves the utilization of incubation temperatures falling within the range of approximately 30° F. to approximately 50° F. It is, however, preferable to use temperatures around 38° F. to 40° F. The utilization of such relatively low temperatures not only produces fatty acids in the desired combination but also it retards bacterial growth. It will thus be seen that the utilization of the low temperature has the multiple advantage of—

(a) Accelerating the production of the free fatty acids;

(b) Selectively promoting the hydrolysis of particular acids to the end of producing the desired combination or mixture of free fatty acids in the finished product;

(c) Permitting the hydrolysis to be conducted to the proper degree without production of inhibitory lactic acid from bacterial growth; and (d) Establishing a temperature condition which is less favorable to bacterial spoilage during the hydrolysis period.

Time of incubation

It is contemplated that hydrolysis be carried out for a period of from approximately sixteen hours to approximately seventy-two hours depending on the prevailing conditions. When the most favorable conditions are maintained, a sufficient quantity of free fatty acids can be produced in a period of from approximately sixteen hours to approximately twenty hours, but when conditions are encountered which are less favorable to the maximum rate of hydrolysis, longer periods are necessary. The upper time limit of the incubation period is fixed by the extent of bacterial growth which occurs. In approximately seventy-two hours such growth increases to such an extent that further incubation is undesirable. In cases in which clarification is not practiced, or agitation is not practiced, or homogenization is only inadequately carried out, an increased time of incubation is necessary, sometimes extending for a period of as long as from twenty-four to forty-eight hours, and possibly to the extent of the maximum period of seventy-two hours.

In addition to what has been said above, it will be appreciated that a marked advantage is realized in the commercial production of this product when the complete cycle of operation can be conducted within a period of twenty-four hours or less, as such practice enables a single set of plant equipment to be used daily for processing each daily supply of milk. For this reason, it is particularly desirable to exercise the controls above stated to the end of accelerating the hydrolysis to the maximum degree and to conduct complete operations within a period of twenty-four hours or less.

As already pointed out, the above-described hydrolysis process not only lends itself to satisfactory commercial practice which can be carried out within the limited time required for the production of adequate quantities of free fatty acids without spoilage of the milk product, but in addition it has been discovered that it provides a means for producing free fatty acids in approximately the quantity ratio which establishes combinations or mixtures of such acids productive of the best flavor characteristics in the finished product.

As previously stated, it has been discovered that the best flavor-bestowing properties of the milk of this invention require the production of free fatty acids in the three above-named categories, namely, volatile water-soluble free fatty acids, volatile water-insoluble free fatty acids, and non-volatile water-insoluble free fatty acids, and that according to the above-described practice the production in the first two categories is slightly excessive in relation to the production of the free fatty acids in the third category, as measured by the method hereinafter described.

As above pointed out, however, this does not provide any serious obstacle for the reason that these applicants have also devised a procedure by which the excessive portions of the free fatty acids in the first two categories can be eliminated, with the result that only free fatty acids productive of the correct combination remain. A better understanding of the nature of the results of the controlled hydrolysis referred to and of the removal of certain of the free fatty acids can be derived from a consideration of the following more detailed information.

One typical and illustrative example of the results of the hydrolysis conducted in accordance with the procedures of this invention is the following:

Whole fresh milk of approximately 4% milk fat content is clarified in a centrifugal clarifier at approximately 65° F. and thereafter homogenized in a two-stage homogenizer operating at a pressure of approximately 3000 pounds per square inch in the first stage and 500 pounds per square inch in the second stage. The milk is fed to the homogenizer at a temperature of approximately 106° F. and taken therefrom at a temperature of approximately 115° F. The milk is next cooled to approximately 38° F. and then held in tanks for incubation. During the incubation of the milk it is recirculated in the tank so as to agitate the same by means of a centrifugal pump which serves to circulate the entire volume of the milk at least once after the hydrolysis has progressed to a substantial extent. The incubation is thus continued for a period of twenty hours, after which it is heated and prepared for the treatment hereinafter described for removing the excessive portions of the volatile water-soluble free fatty acids and the volatile water-insoluble free fatty acids.

Such removal of the free fatty acids produced in excess can be effected by heating and flashing the milk into a vacuum chamber. According to this typical example, the milk, after it is taken from the incubation treatment, is heated to approximately 240° F. and then flashed through a valve into a vacuum chamber maintained under a vacuum of approximately twenty-nine inches of mercury. The flashing action may be conducted in an evaporator wherein evaporation productive of a concentrated milk product also occurs. This is desirable when a concentrated or dried product is sought, as is usually the case when seeking milk for producing milk chocolate.

Accordingly, when a concentrated milk is prepared, either as the final product or as an intermediate product for subsequent drying, the evaporation can be continued and in such cases the flashing and evaporating treatments can be carried out in conventional milk evaporating equipment such as the multiple-stage evaporator. The elimination of the free fatty acids produced in excess, however, occurs during the original flashing action, and such subsequent evaporation does not disturb the process. Proper elimination, however, of the excessive free fatty acids depends upon conducting the flashing in substantially the manner set forth, namely, by introducing the milk product at a temperature of from approximately 212° F. to approximately 280° F., into a chamber having therein a vacuum of from approximately twenty-eight inches of mercury to approximately thirty inches of mercury. Lower temperatures can be utilized with the higher vacuum, and vice versa, and some variation may be effected according to the amount of free fatty acids to be removed. Furthermore, the particular temperature employed for flashing will vary according to the efficiency of the evaporating equipment being used, and for the more efficient designs correspondingly lower temperatures may be used.

In the typical example referred to, after the milk has been flashed into the evaporator as described, a portion of the steam volatile water-soluble free fatty acids and a portion of the steam volatile water-insoluble free fatty acids are removed. This removal by volatilization occurs in the vacuum chamber, with the result that the free fatty acids in each of the above-named categories remain in the product in quantities productive of the desired flavor characteristics.

The final quantities of the free fatty acids remaining in the product are established after the removal by volatilization of approximately 21% by weight of all of the free fatty acids produced by the hydrolysis of the milk fat. Thus, approximately 38% of the volatile water-soluble free fatty acids and 19% of the volatile water-insoluble free fatty acids are removed by the flashing action. Thus, although the total amount of free fatty acids originally present constituted 4.42% of the fat before the flash volatilization, the total fatty acid content after flash volatilization constituted 3.50% of the total weight of the fat. Accordingly, the loss occasioned by the flashing represents .92% of the total weight of the original fat.

It might be mentioned here that as evidence of the necessity to flash at the relatively high temperature referred to, tests have shown that a similar flashing treatment conducted at 180° F., that is to say, a temperature commonly used for evaporating purposes, does not produce any appreciable removal of the free fatty acids as required for the purposes of this invention.

Whereas the above specific example refers to the amounts of free fatty acids in the fat in terms of percentages by weight, the more conventional method of identifying the extent of hydrolysis in actions of this type is by reference to "free fatty acid degrees." "Free fatty acid degrees" is well understood in this art to mean the number of milliliters of .01 normal alkali required to neutralize the fatty acids in one gram of fat. The quantity of free fatty acids present in each of the three categories is determined by a steam distillation technique. The apparatus is similar to that employed in the determination of the Reichert-Meissl number as described in Official Methods of Analysis of the Association of Official Agricultural Chemists, 7th edition, 1950, pages 436–437, except that a separate steam generator is employed and a coarse sintered glass filter disk is placed between the condenser and receiver to collect the steam volatile, water-insoluble, fatty acid fraction. A total of 100 to 120 micromoles of fatty acids are extracted from the lipolyzed fat and distilled at a rate such that 300 milliliters of distillate are collected in a period of approximately one hour. As expressed in free fatty acid degrees, the combination of free fatty acids produced by the hydrolysis of the above-stated typical example, before flash volatilization, is as follows:

| Volatile Water-soluble free fatty acids | Volatile Water-insoluble free fatty acids | Non-volatile Water-insoluble free fatty acids |
|---|---|---|
| 17.6 degrees | 8.1 degrees | 4.7 degrees | or a total of 30.4 degrees, which represents 4.42% hydrolysis by weight.

After flashing, the combination is represented in free fatty acid degrees as follows:

| Volatile Water-soluble free fatty acids | Volatile Water-insoluble free fatty acids | Non-volatile Water-insoluble free fatty acids |
|---|---|---|
| 11.1 degrees | 6.4 degrees | 4.7 degrees | or a total of 22.2 degrees, which represents the total amount of 3.50% free fatty acids by weight in the fat.

As another factor in conducting this process, it should be known that the hydrolysis should not be conducted beyond the point of converting more than approximately 8% of the fat present into free fatty acids, or more than approximately 40 degrees. As a lower limit, the hydrolysis should be conducted for a period sufficient to convert at least approximately 2.75% of the original fat, or, in other words, approximately 15 free fatty acid degrees.

As is well known in this art, the relationship between free fatty acid degrees and quantity of free fatty acids by weight differs, depending upon the molecular weight of the particular free fatty acids referred to. Since it is difficult to determine the average molecular weight of the free fatty acids recovered in each of the three categories, the results are expressed in terms of equivalent weights calculated as oleic acid.

By way of comparison with the prior art, milk fat hydrolysis conducted under conditions described by Otting and Hollender, according to which temperatures are employed which cause the fat to exist in a melted or liquid state, results in the production of free fatty acids in which the quantities, respectively, of the component acids are present more approximately in the same ratio as they existed in the form of triglycerides in the original fat from which the fatty acids are produced. Specifically, such fatty acids, when placed in the three above-named categories, would be present in quantity substantially as follows:

PERCENTAGE DISTRIBUTION OF FREE FATTY ACIDS (EXPRESSED AS EQUIVALENT WEIGHTS OF OLEIC ACID)

| Process | Material | Volatile Water-soluble free fatty acids | Volatile water-insoluble free fatty acids | Non-volatile water-insoluble free fatty acids |
|---|---|---|---|---|
| | | Percent | Percent | Percent |
| Complete hydrolysis | Natural Butter Fat | 22.10 | 67.26 | 10.64 |
| Otting and Hollender | Steapsin Lipolyzed Cream lipolyzed at 105° F. | 28.84 | 51.09 | 20.08 |
| Otting | Butteroil separated from lipolyzed cream | 30.30 | 58.60 | 11.10 |
| This invention | Incubated milk 40° F. before flashing | 57.89 | 26.65 | 15.46 |
| Do | Incubated milk after flashing | 50.00 | 28.83 | 21.17 |

The above table shows the distribution of free fatty acids in each category by equivalent weight expressed as oleic acid, based on the total free fatty acids hydrolyzed.

In the combination of free fatty acids produced by the Otting and Hollender processes the acids are present in ratio similar to the ratio of the fatty acids as they exist in the form of triglycerides in the original fat.

Thus, the non-volatile fatty acids when formed by an hydrolysis under conditions described by Otting and Hollender are present in excess of the volatile free fatty acids. This is the reverse of the results of hydrolysis conducted under the conditions of the present invention, where the volatile free fatty acids are formed in excess of the non-volatile free fatty acids.

As a further typical and illustrative example may be mentioned the following: Milk is treated according to the procedure constituting the first example, with the exception that the hydrolysis is conducted to an extent sufficient to produce thirty-five free fatty acid degrees. After flashing, it will be found that a total of 26.15 degrees remained in the product, made up of free fatty acids from each of the three categories in the following quantities:

| Volatile Water-soluble free fatty acids | Volatile Water-insoluble free fatty acids | Non-volatile Water-insoluble free fatty acids |
|---|---|---|
| 14.94 degrees | 7.01 degrees | 4.20 degrees |

As a further and illustrative example, the procedure of the first example may be followed but with the hydrolysis conducted to an extent to produce, before flashing, 20 free fatty acid degrees. After flashing, the free fatty acids in the product will be distributed as follows:

| Volatile Water-soluble free fatty acids | Volatile Water-insoluble free fatty acids | Non-volatile Water-insoluble free fatty acids |
|---|---|---|
| 6.65 degrees | 4.80 degrees | 2.42 degrees |

All of the products produced in accordance with this invention, when subsequently dried and employed in the manufacture of milk chocolate, impart to the chocolate a very desirable and pleasing flavor.

As illustrative of the necessity for flashing in the manner described, reference may be made to a further test where no flashing was carried out. In that instance, the above-identified procedure was followed but with the hydrolysis conducted to a point of producing approximately 22 degrees free fatty acid. It was found that this included free fatty acids of the various categories substantially as follows:

| Volatile Water-soluble free fatty acids | Volatile Water-insoluble free fatty acids | Non-volatile Water-insoluble free fatty acids |
|---|---|---|
| 13.95 degrees | 5.69 degrees | 2.65 degrees. |

When that product was subsequently dried and employed in the manufacture of chocolate, its flavor was characterized as poor, bitter, and flat, and was devoid of the high milk flavor which characterizes the products produced according to this invention.

In the foregoing, where reference has been made to the particular combinations of free fatty acids, it is to be understood that some variation therein is contemplated to allow for variations that occur in the characteristics of milk derived from different sources. It is known, for instance, that milk produced at different seasons of the year and under different feed conditions, and produced by cows of different breeds, will show some slight differences in the distribution of fatty acids existing in the milk fat. Consequently, some slight variation in the distribution resulting from hydrolysis will necessarily occur depending upon such variations found in the original milk being processed. What is said here, therefore, is intended to embrace such slight variation.

Milk produced according to this invention can be used with a high degree of success in the form of a powder. This is particularly true when the product is to be used for making milk chocolate or for any other product wherein the use of milk solids are to appear in a relatively dry form. Accordingly, the concentrated milk produced according to the procedure above outlined may be further processed for producing a milk powder. It is found, however, that the drying procedure employed ordinarily should be a spray drying operation like those used for drying whole milk powder. Drum drying methods are not satisfactory to provide the best results. If drum drying methods are employed for drying the product of this invention, the finished product would be superior to regular unhydrolyzed drum dried powdered milk but it would be markedly inferior to the product resulting from spray drying. It should be understood, however, that drum drying, if carried out under vacuum conditions, is much more acceptable than is the product which is drum dried at atmospheric pressure. Furthermore, the moisture content should be reduced to a relatively low level, not to exceed approximately 3% to 4%, and preferably not more than approximately 2%.

As a further teaching with respect to this invention, it is here pointed out that the success of this invention as applied to whole milk powder depends upon maintaining a substantial amount of the dried fat particles in that particular associated relationship with respect to the non-fat solids in milk, known to the art as "free fat" relationship. It is understood in this art that various drying techniques exert different effects upon the associated relationship between the fat and the non-fat particles in a dry product, and that in some instances the fat is more intimately attached to the non-fat solids than it is in other instances. When the fat is disposed in what may be regarded as a relatively loose association, whereby it is subject to being readily freed from intimate contact with the non-fat milk particles, it is referred to herein and in the art as being "free fat." The existence of fat in the form here referred to as "free fat" is subject to being determined, by way of test, by direct ether extraction, and the term refers to that part of the fat which can be so extracted with ether directly from the powder. The remaining fat is non-free fat and is that which is sometimes referred to as "bound fat." Bound fat can be extracted with ether only after the fat particles have been loosened by some suitable treatment, such as by moistening or steaming the milk powder.

Inasmuch as one of the major utilities of the present invention is found in its flavor-imparting characteristics, it is important to have the flavor which it imparts quickly detectable when milk chocolate made therefrom is placed in the mouth. Experiments have shown that the readiness with which the desirable flavor referred to can be detected is to a considerable extent dependent upon the degree to which the fat and its associated fatty acids present are associated with the non-fat solids of the milk in the form of so-called "free fat." The amount of free fat that exists in dry whole milk powders now produced on the market according to commercial equipment varies somewhat according to the procedure by which the powder is made. For instance, an examination of twenty-five dried whole milk products now supplied on the market by different manufacturers shows that the amount of free fat in the powder varies from 0.5% as the smallest amount up to 3.7% as the highest.

It is found that in order to produce the quick-taste response above referred to, the powder produced according to this invention should have fat present therein in the form of free fat in quantity of at least 4%, and with optimum results at approximately 8% and above.

According to this invention, in addition to the regular spray drying treatment employed for producing the powder, the milk should be further treated in order to be sure that it contains the requisite quantity of fat as free fat. In order to accomplish this result, the powder, relatively low in free fat as it comes from the drier, is passed through a fan or micropulverizer, or a muller, or any combination or all of these depending upon the amount of change that is required to convert the low, free-fat powder to relatively high, free fat powder. By actual test, the applicants increased the free fat in dry milk powder from the original amount of 2.03% to 9.62% by subjecting it to the action of a micropulverizer. Similarly, through the use of a fan, milk powder having an original free fat content of 2.48% was increased to 12.30%. In still further instances, a powder having an original free fat content of 3.18% was raised to a free fat content of 4.08% by subjecting it for one minute to the action of a muller; to a free fat content of 4.49% by subjecting it to the action of a muller for two minutes; to 5.93% by subjecting it to the action of a muller for five minutes; and to 7.78% by subjecting it to the action of a muller for ten minutes.

The following table will serve as a guide showing the relationship between the quantity of fat present as free fat and the milk flavor in chocolate:

| Free Fat, Percent | Milk Flavor in Chocolate |
|---|---|
| 2.75 | Very poor, slow flavor development in mouth. |
| 3.09 | Poor, slow flavor development in mouth. |
| 4.00 | Fairly good, fairly prompt flavor development in mouth. |
| 4.26 | Very good, prompt flavor development in mouth. |
| 5.93 | Very good, very prompt flavor development in mouth. |
| 7.73 | Excellent, very prompt flavor development in mouth. |

It should be known that the presence of fat as free fat is more important in the manufacture of chocolate when the chocolate is not extensively conched or processed to a substantial degree in a melange or on refining rolls. Such refining of chocolate serves to develop an improved flavor characteristic therein, somewhat similar to that imparted by the presence of requisite amounts of free fat, and therefore the development of free fat in the product is more important in the manufacture of chocolate in those cases where extensive refining is not employed. It will be understood, however, that by providing a milk product which will impart good flavor characteristics, the necessity for such extensive refining treatments is reduced or eliminated.

The spray dried product produced according to this invention is a powdered milk containing milk fat lipolyzed, for the most part, by natural milk lipase contained in the milk while the milk is in natural fluid state, and conducted under control conditions productive of an adjusted predetermined combination of free fatty acids. As a result, the different classes of fatty acids, namely, the volatile water-soluble, volatile water-insoluble, and non-volatile acids, are present in such relative amounts as to fall within the ratios productive of good or high milk flavor. It will also be observed that the volatile acids produced in excess of the desired ratios are brought within the ratios productive of optimum flavor by flash evaporation, using temperatures above substantially 212° F. and preferably in the order of between 240° F. and 260° F. It will further be noted that the product in its finished form contains no active lipase and consequently no further enzymic hydrolysis can occur in the product in storage or shipment.

The finished product contains the water-soluble products of hydrolysis, including the water-soluble portions of monoglycerides. Such portions are distributed uniformly in the dried non-fat portions of the milk powder and are available for flavor and physical effect when the non-fat portions of the powder are dissolved in the moisture of the mouth. The finished powder is highly soluble in water and contains an optimum quantity of free fat. It is to be understood, however, that the fat content and the extent of lipolysis can be adjusted within relatively wide limits as hereinabove set forth, and to accord with the needs of particular uses and particular manufactures.

In order to better illustrate the process for the manufacture of milk products in accordance with this invention, reference may be had to the accompanying drawings, in which—

Figure 1:
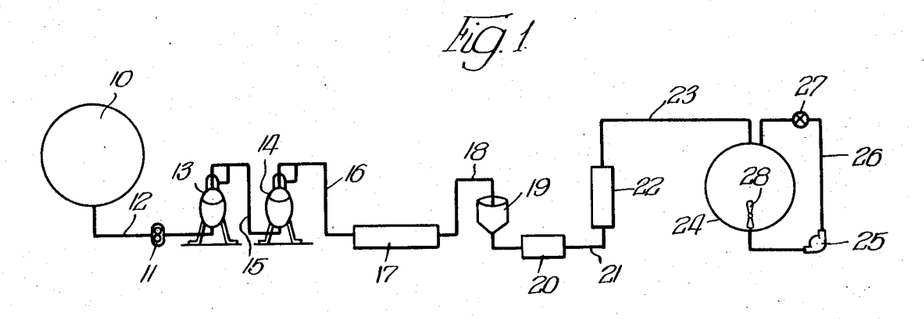
Figure 1 is a flowsheet illustrating one procedure and set of equipment for preparing and incubating milk according to this invention.

Referring to Figure 1 of the drawings, 10 represents a raw milk storage tank where the milk to be treated can be held at a temperature of approximately 60° F. 11 is a pump which serves to convey the milk through line 12 from the tank 10 to a pair of cold clarifiers 13 and 14 which are here shown connected in series by the line 15. The clarifier 14 is connected by line 16 to a warmer 17 which serves to heat the milk to a temperature of approximately 103° F. to 106° F. From the warmer, the milk passes through a line 18 to a surge tank 19 and thence to an homogenizer 20. In the homogenizing treatment, the milk is subjected to a pressure of approximately 3000 pounds per square inch in the first stage and approximately 500 pounds per square inch in the second stage.

The milk passes from the homogenizer 20 through line 21 into a cooler 22. The milk emerging from the homogenizer has a temperature of approximately 112° F. to 118° F., and the cooler 22 serves to bring the temperature down preparatory to the incubation treatment. The milk leaving the cooler 22 through pipe 23 has a temperature of between approximately 36° F. and 42° F. At this temperature, the milk passes into an incubation and standardization tank 24 which has a suitable outlet, not shown. 25 is a centrifugal pump used for recirculating the milk through line 26 for the purpose of agitating the same. 27 is a valve in the recirculating line which is employed to increase the head of pressure and thus reduce the efficiency of the pump. 28 is an agitator or one of a series of agitators employed in the incubation and standardization tank for purposes above described.

Figure 2:
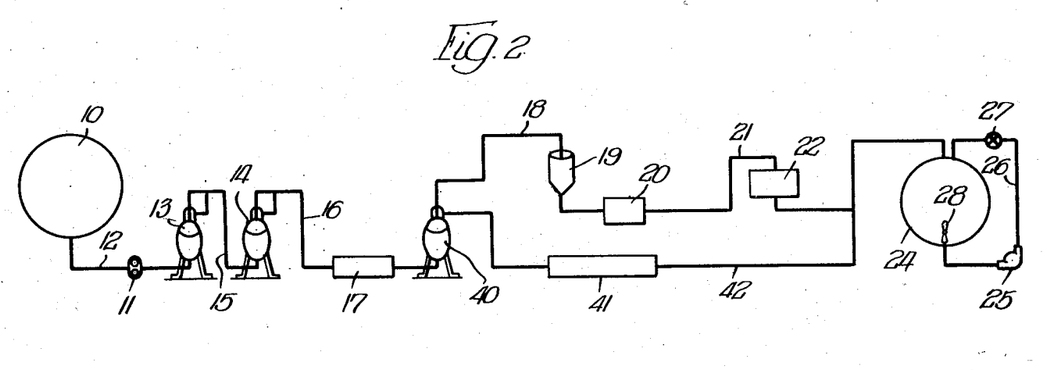
Figure 2 illustrates a similar but somewhat modified procedure and equipment for carrying out the invention.

Referring to Figure 2, it will be noted that the procedure and equipment is quite similar, but that it differs in that a separator 40 has been introduced into the system immediately after the heater 17, and that a separator serves to separate the cream from the skim milk. As a result of these changes, the homogenizing treatment is imparted to the cream only and the homogenized cream and skim milk are either separately cooled and brought together for introduction into the incubation tank, or are first brought together and then cooled prior to the introduction into the incubation tank. In the apparatus shown in Figure 2, two separate coolers are employed, one of which is cooler 41 incorporated in the skim milk line 42. The other parts which are similar to those of Figure 1 will not be described in detail, but are identified on the drawing by the same reference numerals applied to the corresponding parts of Figure 1. It will be noted that the upper line, which contains the surge tank 19, homogenizer 20, and cooler 22, is in the cream line passing from the separator 40.

Figure 3:
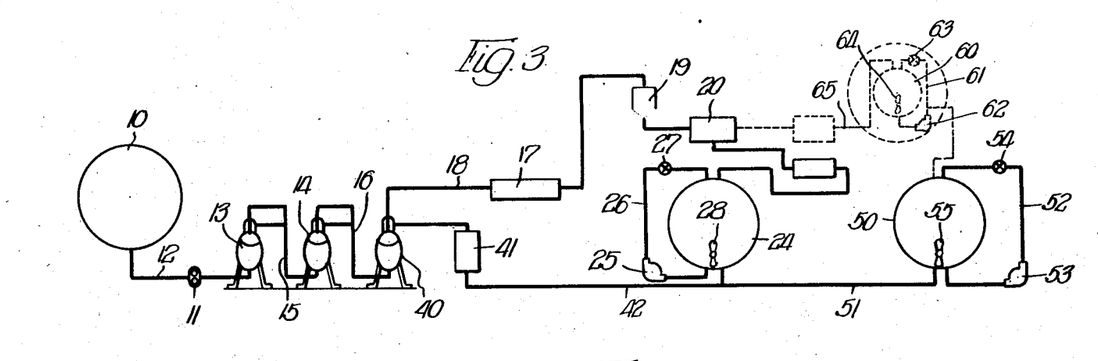
Figure 3 is a further modified procedure and equipment for preparing and incubating the milk according to this invention.

Referring now to Figure 3, it will be observed that the procedure and equipment disclosed are substantially the same as that shown in Figure 2, with the exception that two additional incubation tanks are shown. To the extent that the equipment is the same as that illustrated in Figure 2, similar reference numerals have been employed.

In addition to the incubation tank 24, a second incubation tank 50 is shown, connected to the skim milk line 42 by a line 51. The tank 50 also has a recirculating line 52 equipped with a centrifugal pump 53, and a valve 54 corresponding to the valve 27. The tank also includes an agitator or agitators 55. There is also shown in dotted lines a still further incubation tank 60 having a recirculating pipe 61 containing a centrifugal pump 62 and a valve 63. This tank is equipped with an agitator or agitators 64, and is connected by a line 65 to the homogenizer 20.

The advantages of the procedure and equipment illustrated in Figure 3 are two-fold. According to this procedure, it is possible to obtain homogenization with a smaller homogenizer since the fat being homogenized is concentrated or reduced in volume. An additional advantage is derived from incubating the cream separately. In some instances, a plant receiving an excess amount of skim milk may proceed to evaporate such excess and produce a skim milk concentrate or some other product while the cream, according to this procedure, is being incubated in the smaller incubating tank. Thereafter, as more raw skim milk is received from the plant, the cream may be dropped into one of the other tanks and mixed with skim milk for conducting the final part of the hydrolysis. In addition, it is frequently desirable to produce a product containing a high amount of free fatty acids, that is to say, in the order of 25 degrees to 30 degrees free fatty acids. When such a large amount of free fatty acids is desired, it is expedient to incubate the cream at a temperature of around 90° F. for a period of from two to four hours and then to drop the cream so incubated into cold, raw skim milk for a completion of the hydrolysis. At 90° F., a free fatty acid degree of around 8 to 10 may be obtained in the fat of the cream within the relatively short period of from approximately two to four hours. Although free fatty acids so hydrolyzed do not exist in the product in the correct ratio between volatile and non-volatile free fatty acids, as the non-volatiles are excessively produced at 90° F., the amount of non-volatile free fatty acids is not so great that it cannot be compensated for during the later and chief hydrolysis conducted in the presence of cold skim milk, that is to say, conducted at a temperature below substantially 50° F. It is found that such practice will result in a free fatty acid distribution within the range desired.

It will thus be seen that by incubating cream at 90° F. for a very short period, more total free fatty acids can be formed than at a lower temperature in a given time, and yet the ratio of the different acids is not greatly affected because a large part of the hydrolysis is carried out at the lower temperature.

Figure 4:
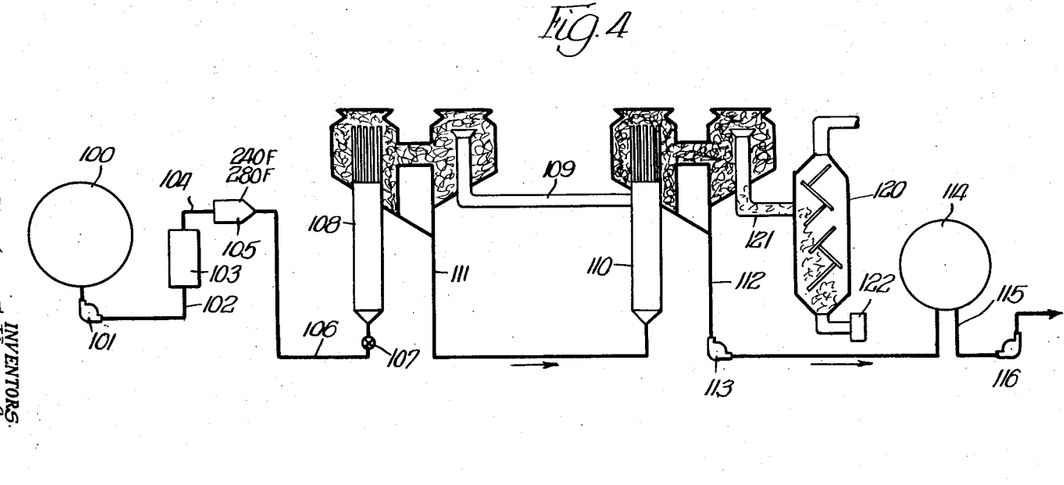
Figure 4 is a flowsheet illustrating condensing procedure and equipment for concentrating and flash evaporating the incubated milk.

Referring now to Figure 4, a storage tank 100 is provided for the milk that has been incubated according to this invention. The milk so stored is pumped by a pump 101 from the storage tank 100 through line 102 into a heater 103 where it is heated to a temperature of approximately 175° F. to 200° F. The milk next passes through line 104 into a second heater 105 where the temperature is raised to from 240° F. to 280° F. It then passes through line 106 and through a valve 107 and is thus flashed into the tubes of a first effect 108 of a multiple effect evaporator. The evaporator shown is of known design, and it will be observed that the vapors produced in the first effect are fed through line 109 and serve as a source of heat for the second effect 110. The concentrated milk passes out of the first effect through line 111 into the bottom of the second effect. The milk from the second effect is finally taken through line 112 by means of pump 113 and is fed to the storage tank 114. The concentrated milk may thereafter be taken from the tank through line 115 by means of pump 116 and fed to suitable spray drying equipment. 120 is a condenser which is connected by pipe 121 to the second effect and serves to condense the water vapors and fatty acids which are collected in the bottom thereof as at 122.

In addition to concentrating the milk, the evaporators shown, and particularly the first effect thereof, flash off the unwanted excessive volatile water-soluble fatty acids and the volatile water-insoluble fatty acids in amounts as hereinabove pointed out and determined by the feed temperature.

It is to be understood that the evaporator may be of any suitable construction and may be a single, double, or multiple effect type. If desired, a Vacreator may be used ahead of the evaporator to flash volatile acids when a vacuum pan 1 is used instead of a rising and falling film type of evaporator.

The milk collected in tank 114 usually contains between approximately 30% and approximately 50% solids.

It is to be understood that the ingredient in the milk product here produced which imparts the desirable flavor is the combination of free fatty acids which exist in the desired relative proportions. Consequently, this invention contemplates a milk fat product containing from approximately 2.75% to approximately 8% of the fat present as free fatty acids, or, as stated in degrees, from approximately 15 degrees to approximately 40 degrees in the fat present. Furthermore, as expressed in percentage equivalent weight, calculated as oleic acid, the volatile water-soluble free fatty acids and the volatile water-insoluble free fatty acids, and the non-volatile water-insoluble free fatty acids should exist in the combination somewhere in the neighborhood of the percentages set forth above, namely, 50.0% for the first group, 28.8% for the second group, and 21.2% for the third group. Of course, these figures are not to be considered as strictly limiting, as reasonable variation from these quantities will still produce a combination which imparts desirable flavor. Expressed in terms of degrees, it will be noted that when a total of 30.4 degrees, which represents 4.42% of the total fat, has been hydrolyzed, the ratio for each group will be 11.1 degrees for the first group, 6.4 degrees for the second group, and 4.7 degrees for the third group, after flashing. Other variations in degrees are hereinabove set forth and are to be consulted as guides concerning the particular ratio of free fatty acids in each group.

The product of this invention can be utilized in making milk chocolate, in which event from between approximately 20% up to approximately 100% of the milk fat requirements for the manufacture of chocolate can be supplied by utilizing the product of this invention. When chocolate is so made, the other ingredients, such as chocolate, sugar, and any other substances called for in the recipe to be used, can be added according to known procedure now in general use. In other words, the chocolate of this invention can be made like any other chocolate except that as a substitute for a portion or all of the milk fat requirements thereof, milk fat produced in accordance with this invention may be added in quantity of from approximately 20% to approximately 100% of such requirements.

As has been stated above, approximately 20% to approximately 100% of the milk fat requirements for the manufacture of chocolate may be supplied by utilizing the product of this invention. Also, from small amounts to 100% of the milk fat requirement of products other than chocolate may be supplied by the product of this invention. However, this invention contemplates the desirability, at times, of diluting the flavor intensity and controlling composition of the product prior to use in a particular manufacture for which it is intended. The additional practice of controlling flavor intensity and composition may be accomplished by adding normal, unincubated whole milk, cream, partially skimmed milk, or nonfat milk after the incubation is substantially completed. The desired unincubated milk substance may be added just prior to flash treatment and evaporation, or such substance may first be evaporated and added in concentrate form to the flashed and evaporated product of incubation, and the resulting concentrate may then be dried or it may be mixed in dried form to the dried product of this incubation. However, the incubated portion must be prepared according to the disclosures of the invention in order to provide proper flavor characteristics, even though dilution and changes in composition may be made after the incubation has been substantially completed.

What is claimed is:

1. The process of producing a new milk product containing milk fat which is capable of imparting a high milk flavor to various food products to which it is added as an ingredient, which comprises hydrolyzing from approximately 15 degrees to approximately 40 degrees of free fatty acids in the milk fat by the action, for the most part, of the natural lipase of the milk, while said milk is maintained at a temperature of between approximately 30° F. and 50° F., and thereafter removing from approximately 30% to approximately 45% of the volatile water-soluble free fatty acids and from approximately 15% to approximately 25% of the volatile water-insoluble free fatty acids.

2. The process of producing a new milk product containing milk fat which is capable of imparting a high milk flavor to various food products to which it is added as an ingredient, which comprises hydrolyzing from approximately 15 degrees to approximately 40 degrees of free fatty acid in the milk fat by the action, for the most part, of the natural lipase of the milk, while said milk is maintained at a temperature of between approximately 30° F. and 50° F., and thereafter removing from approximately 30% to approximately 45% of the volatile water-soluble free fatty acids and from approximately 15% to approximately 25% of the volatile water-insoluble free fatty acids by steam evaporation.

3. The process of producing a new milk product containing milk fat which is capable of imparting a high milk flavor to various food products to which it is added as an ingredient, which comprises hydrolyzing from approximately 15 degrees to approximately 40 degrees of free fatty acid in the milk fat by the action, for the most part, of the natural lipase of the milk, while said milk is maintained at a temperature of between approximately 30° F. and 50° F., and thereafter removing a portion of the volatile water-soluble free fatty acids and a portion of the volatile water-insoluble free fatty acids by steam evaporating said product at a temperature of between approximately 212° F. and 280° F. in a vacuum of from 28 inches of mercury to approximately 30 inches of mercury.

4. The process of claim 1, further characterized in that the hydrolysis is conducted for a period of from approximately sixteen hours to approximately seventy-two hours.

5. The process of claim 3, further characterized in that the hydrolysis is conducted for a period of from approximately sixteen hours to approximately seventy-two hours.

6. The process of claim 1, further characterized in that the hydrolysis is conducted with a fat concentration of the milk of approximately 12% or less.

7. The process of claim 3, further characterized in that the hydrolysis is conducted with a fat concentration of the milk of approximately 12% or less.

8. The process of claim 1, further characterized in that the milk is first clarified at a temperature of between 65° F. and 90° F.

9. The process of claim 1, further characterized in that the milk is homogenized to reduce the particle size of the fat globules thereof to approximately 3 microns or less before the same is hydrolyzed.

10. The process of claim 1, further characterized in that hydrolysis is carried out with agitation.

11. The process of claim 1, further characterized in that the milk product is first clarified at a temperature of between 65° F. and 90° F. and subsequently homogenized to reduce the particle size of the fat globules to approximately 3 microns or less and at a temperature of not to exceed 120° F. leaving the homogenizer.

12. The process of claim 1, further characterized in that the milk product is first clarified at a temperature of between 65° F. and 90° F., and subsequently homogenized to reduce the particle size of the fat globules to approximately 3 microns or less and at a temperature of not to exceed 120° F. leaving the homogenizer, and further characterized in that the hydrolysis is conducted with agitation.

13. The process of claim 3, further characterized in that the milk is first clarified at a temperature of between 65° F. and 90° F.

14. The process of claim 3, further characterized in that the milk is homogenized to reduce the particle size of the fat globules thereof to approximately 3 microns or less before the same is hydrolyzed.

15. The process of claim 3, further characterized in that hydrolysis is carried out with agitation.

16. The process of claim 3, further characterized in that the milk product is first clarified at a temperature of between 65° F. and 90° F., and subsequently homogenized to reduce the particle size of the fat globules to approximately 3 microns or less and at a temperature of not to exceed 120° F. leaving the homogenizer.

17. The process of claim 1, further characterized in that the milk product is first clarified at a temperature of between 65° F. and 90° F., and subsequently homogenized to reduce the particle size of the fat globules to approximately 3 microns or less and at a temperature of not to exceed 120° F. leaving the homogenizer, and further characterized in that the hydrolysis is conducted with agitation.

18. The process of producing a milk powder containing milk fat capable of imparting a high milk flavor to various products to which it is added as an ingredient, which comprises hydrolyzing milk fat according to claim 1, and thereafter spray drying said product to reduce the water content thereof to approximately 4% or lower.

19. The process of producing a milk powder containing milk fat capable of imparting a high milk flavor to various products to which it is added as an ingredient, which comprises hydrolyzing milk fat according to the process of claim 1, thereafter spray drying said product to reduce the water content thereof to approximately 4% or lower, and thereafter refining said product to increase the so-called free fat content thereof to a point in excess of approximately 4%.

20. The process of producing a milk powder containing milk fat capable of imparting a high milk flavor to various products to which it is added as an ingredient, which comprises hydrolyzing milk fat according to claim 3, and thereafter spray drying said product to reduce the water content thereof to approximately 4% or lower.

21. The process of producing a milk powder containing milk fat capable of imparting a high milk flavor to various products to which it is added as an ingredient, which comprises hydrolyzing milk fat according to the process of claim 3, thereafter spray drying said product to reduce the water content thereof to approximately 4% or lower, and thereafter refining said product to increase the so-called free fat content thereof to a point in excess of approximately 4%.

22. A food product, comprising milk fat hydrolyzed to a free fatty acid degree of from approximately 15 degrees to approximately 40 degrees, and in which hydrolyzed fat in three classes of free fatty acids exist in the ratio of approximately 5:3:2 by weight when measured according to the method set forth in the specification and when such fatty acids are expressed in terms of equivalent weight of oleic acid, and in which the classes of free fatty acids are present in amounts to give from substantially 15 degrees to substantially 6 degrees of volatile water-soluble free fatty acids, or from substantially 13 degrees to substantially 5 degrees of volatile water-insoluble free fatty acids, and from substantially 5 degrees to substantially 2 degrees of non-volatile water-insoluble free fatty acids.

23. A food product of the type defined in claim 22, further characterized in that such milk fat is incorporated with milk solids not fat.

24. A spray dried milk product having a moisture content of less than approximately 4%, containing milk solids not fat and modified milk fat of the type defined in claim 22.

25. An improved milk chocolate having from approximately 20% to approximately 100% of its milk fat requirements composed of the milk fat product defined in claim 22.

26. The process of improving the flavor of milk chocolate, which comprises adding thereto from approximately 20% to approximately 100% of its milk fat requirements of the milk fat product defined in claim 22.

CLAYTON A. KEMPF.
JOY SUTHERLAND NEIDLINGER.
AUBREY P. STEWART, JR.
PAUL F. SHARP.

References Cited in the file of this patent

UNITED STATES PATENTS

| Number | Name | Date |
|---|---|---|
| 668,253 | Campbell | Feb. 19, 1901 |
| 1,966,460 | Otting | July 17, 1934 |
| 2,169,273 | Otting | Aug. 15, 1939 |
| 2,519,833 | Hallqvist | Aug. 22, 1950 |
| 2,539,125 | Froding | Jan. 23, 1951 |